US008711865B2

(12) United States Patent
Vinneras

(10) Patent No.: US 8,711,865 B2
(45) Date of Patent: *Apr. 29, 2014

(54) AUTO-PROVISIONING OF NETWORK SERVICES OVER AN ETHERNET ACCESS LINK

(75) Inventor: Ulf Vinneras, Lidingo (SE)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/428,946

(22) Filed: Mar. 23, 2012

(65) Prior Publication Data

US 2012/0182998 A1    Jul. 19, 2012

Related U.S. Application Data

(63) Continuation of application No. 11/603,993, filed on Nov. 21, 2006, now Pat. No. 8,144,699.

(51) Int. Cl.
*H04L 12/28* (2006.01)

(52) U.S. Cl.
USPC ..................................... 370/395.53; 370/389

(58) Field of Classification Search
None
See application file for complete search history.

(56) References Cited

U.S. PATENT DOCUMENTS

| 5,289,462 | A * | 2/1994 | Ahmadi et al. ............... 370/232 |
| 6,678,273 | B1 | 1/2004 | Brown |
| 6,789,121 | B2 | 9/2004 | Lamberton et al. |
| 7,180,899 | B2 | 2/2007 | De Silva et al. |
| 7,411,915 | B1 | 8/2008 | Spain et al. |
| 2003/0007609 | A1 | 1/2003 | Yuen et al. |
| 2003/0048380 | A1 | 3/2003 | Tamura |
| 2004/0090970 | A1 | 5/2004 | Sanchez et al. ............... 370/397 |
| 2004/0165600 | A1 | 8/2004 | Lee |
| 2004/0170156 | A1 | 9/2004 | O'Neill |
| 2004/0228336 | A1 | 11/2004 | Kung et al. |
| 2005/0195848 | A1 * | 9/2005 | Braneci et al. ................ 370/421 |
| 2005/0253718 | A1 | 11/2005 | Droms et al. |
| 2006/0182146 | A1 * | 8/2006 | Monette et al. ............... 370/473 |
| 2006/0184695 | A1 * | 8/2006 | Monette et al. ............... 709/246 |
| 2007/0025341 | A1 | 2/2007 | Baigai et al. |

FOREIGN PATENT DOCUMENTS

| WO | WO 2005/060208 A1 | 6/2005 | ............. H04L 29/06 |
| WO | WO 2006/085292 A1 | 8/2006 | ............. H04L 12/46 |

OTHER PUBLICATIONS

Technical Report TR-069 of the DSL Forum, "CPE WAN Management Protocol", May 2004.
Technical Specification MEF 16 of the Metro Ethernet Forum, "Ethernet Local Management Interface (E-LMI)", Jan. 2006.

(Continued)

*Primary Examiner* — David Oveissi
(74) *Attorney, Agent, or Firm* — Baker Botts L.L.P.

(57) ABSTRACT

In one embodiment, an apparatus includes an Ethernet port, for connection to an Ethernet access network providing multiple different services. A plurality of local service ports are provided for connection to items of peripheral customer premises equipment (CPE), each item supporting a different, respective service. A bridge is coupled to convey data frames between the Ethernet port and the local service ports. A controller is coupled to receive via the Ethernet port at least one provisioning message indicating associations between the services and respective Virtual Local Area Network (VLAN) identifiers, and to configure the bridge, responsively to the provisioning message, to forward the data frames received via the Ethernet port on each VLAN to a respective service port in accordance with the associations.

20 Claims, 2 Drawing Sheets

(56) References Cited

OTHER PUBLICATIONS

European Patent Office, Munich Germany, Communication re: extended EU search report pursuant to Rule 62 EPC, the supplementary EU search report (Art. 153(7) EPC), and the EU search opinion, for Application No. 07864517.3-2416 / 2084858, Ref. P32533EP-PCT, PCT/US2007084925 (7 pgs), Mailed: Aug. 8, 2012.

* cited by examiner

AUTO-PROVISIONING OF NETWORK SERVICES OVER AN ETHERNET ACCESS LINK

CROSS REFERENCE TO RELATED APPLICATIONS

This application is a continuation of U.S. application Ser. No. 11/603,993, filed Nov. 21, 2006 by Ulf Vinneras and entitled "Auto-Provisioning of Network Services Over an Ethernet Access Link".

FIELD OF THE INVENTION

The present invention relates generally to provisioning of network services.

BACKGROUND OF THE INVENTION

A number of protocols have been developed to enable auto-configuration and dynamic service provisioning of customer premises equipment (CPE) by network service providers. For example, Technical Report TR-069 of the DSL Forum, entitled "CPE WAN Management Protocol" (May, 2004), describes a protocol for communication between a CPE and an auto-configuration server (ACS) in the Digital Subscriber Line (DSL) access environment. This protocol allows an ACS to provision a CPE at the time of initial connection of the CPE to the broadband network and to re-provision the CPE at any subsequent time. The CPE WAN management protocol operates at the application layer over a TCP/IP-based protocol stack.

For Ethernet-based access networks, Technical Specification MEF 16 of the Metro Ethernet Forum, entitled "Ethernet Local Management Interface (E-LMI)" (January, 2006), which is incorporated herein by reference, describes procedures and a protocol for enabling auto-configuration of customer edge (CE) equipment. The E-LMI protocol is used by the CE to request and receive status and service attribute information from the Metro Ethernet Network (MEN), so that it can configure itself to access Metro Ethernet services. E-LMI messages are encapsulated inside Ethernet frames using a framing structure and message format provided by the specification.

The present invention will be more fully understood from the following detailed description of the embodiments thereof, taken together with the drawings in which:

DESCRIPTION OF EXAMPLE EMBODIMENTS

Overview

Some embodiments of the present invention provide apparatus, such as a customer premises gateway, that includes an Ethernet port for connection to an Ethernet access network providing multiple different services. The services may include, for example, video, telephony, and Internet data services. The apparatus includes a plurality of local service ports for connection to items of peripheral customer premises equipment (CPE). Each such item supports a different, respective service among the multiple different services provided by the Ethernet access network. A bridge in the apparatus is coupled to convey data frames between the Ethernet port and the local service ports. A controller of the apparatus receives via the Ethernet port at least one provisioning message indicating associations between the services and respective Virtual Local Area Network (VLAN) identifiers. Responsively to the provisioning message, the controller configures the bridge to forward the data frames received via the Ethernet port on each VLAN to a respective service port in accordance with the associations.

Moreover, some embodiments of the present invention provide a method that includes receiving an indication that customer premises equipment (CPE) has been connected to a port of an Ethernet access network, which provides multiple different services. Responsively to the indication, at least one provisioning message is transmitted via the port, indicating associations between the services and respective Virtual Local Area Network (VLAN) identifiers. After transmitting the at least one provisioning message, Ethernet frames are conveyed from the network to the port containing data provided by one or more of the services. Each frame includes a VLAN identifier in accordance with the indicated associations.

DESCRIPTION OF EXAMPLE SYSTEM AND GATEWAY

Figure 1:
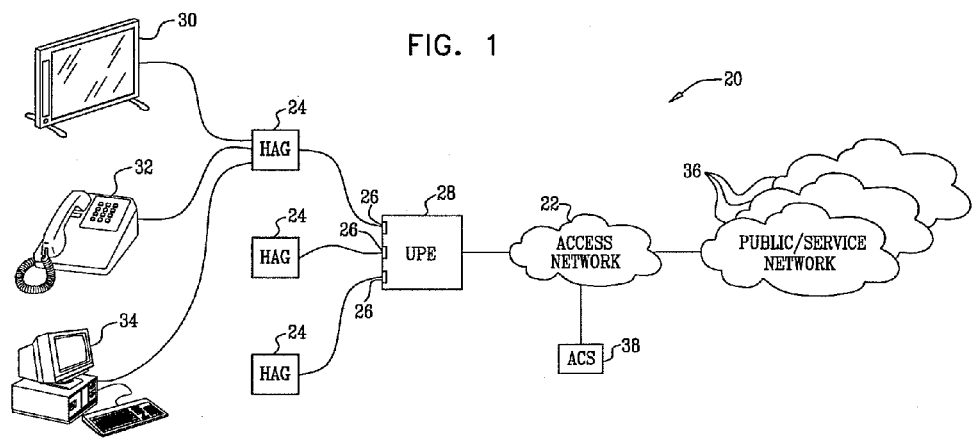
FIG. 1 is a block diagram that schematically illustrates an Ethernet-based network access system, in accordance with an embodiment of the present invention.

FIG. 1 is a block diagram that schematically illustrates an Ethernet-based network access system 20, in accordance with an embodiment of the present invention. In this embodiment, a network service provider maintains an Ethernet access network 22, which serves customer premises via a respective gateway 24 at each of the premises. Such a gateway is referred to in the present description as a home access gateway (HAG), since at least some of the services provided by network 22 to the customer premises (such as packet video—also known as IPTV) are most typically used in the home environment. Gateways 24, however, may be used in similar fashion in providing network services to customer premises of other types, such as small business offices. Details of gateway 24 are described hereinbelow with reference to FIG. 2.

Each gateway 24 connects to network 22 via a respective Ethernet port 26 of a user-facing provider edge (UPE) switch 28. (The term "Ethernet port" is used in the present patent application and in the claims to refer to a physical port using the Ethernet protocol.) Switch 28 transmits Ethernet data frames from network 22 to gateways 24 carrying signaling, management messages, and data content associated with various different network services. Examples of such services may include packet video (IPTV); packet telephony (typically Voice over Internet Protocol—VoIP) and other audio services; Internet data services, such as Web browsing, e-mail, and other data applications; and substantially any other type of network service that is known in the art. The data content may be transmitted to access network 22 from other networks 36, which may include public networks, such as the Internet, as well as dedicated service networks. Gateways 24 and switch 28 typically convey upstream transmissions from the customer premises to networks 22 and 36, as well.

In this embodiment, the network service provider typically assigns a single port 26 to each customer premises. Switch 28 communicates with each gateway 24 by transmitting all Ethernet frames, regardless of the service to which the frame content belongs, through this port. In order to differentiate between the services, however, a different Virtual Local Area Network (VLAN) is used for each service. (VLANs and protocols governing their use are defined in IEEE Standard 802.1Q.) In other words, by way of example, VLAN #20 may be assigned for VoIP, VLAN #30 for video, and VLAN #40 for Internet data. Switch 28 informs gateway 24 of the assignment of VLANs to services in an auto-provisioning procedure, which is described in detail hereinbelow.

Upon receiving the Ethernet frames, gateway 24 distributes the data frames (or their content) to the appropriate items of peripheral customer premises equipment (CPE) for each service, depending on the VLAN identifier in each frame. Thus, in the example shown in FIG. 1, gateway 24 conveys video content to a television 30, VoIP content to a telephone 32, and Internet data to a computer 34. (In a typical service scenario, the video content, in the form of IPTV, may be conveyed to the television via a suitable set-top box, and the VoIP content may be conveyed to an analog telephone via a suitable IP telephony adapter, but these elements are omitted from the figures for the sake of simplicity.) Although IP addresses may be assigned to gateway 24 and/or to certain CPE elements for the purposes of certain services, transmission of the data frames that carry the service content between switch 28 and gateway 24 takes place at the Ethernet (Layer 2) level, via the same Ethernet port, without requiring that the gateway perform any IP (Layer 3) routing functions. The gateway distributes the data frames using the Layer 2 VLAN mechanism described above.

Similarly, the auto-provisioning procedure by which the gateway is informed of the VLAN/service tag associations to be used in distributing the data frames can be carried out entirely at Layer 2, regardless of whether or not the gateway has been assigned an IP address. (Optionally, after auto-provisioning of a VLAN for management purposes, gateway 24 may use an IP address for management-related communications.) Switch 28 may be pre-configured with provisioning information, including VLAN assignments, so that the auto-provisioning of gateway 24 can be carried out by the switch itself. Alternatively, the switch may be configured so that upon receiving a provisioning request from a gateway, the switch passes the request through to an auto-configuration server (ACS) 38 via network 22. In response, server 38 sends provisioning data frames back to switch 28, which passes them through to the gateway. The principles of the auto-provisioning method are substantially the same in either case. A Layer 2 auto-provisioning procedure that may be used for these purposes is described in detail hereinbelow with reference to FIG. 3.

Figure 2:
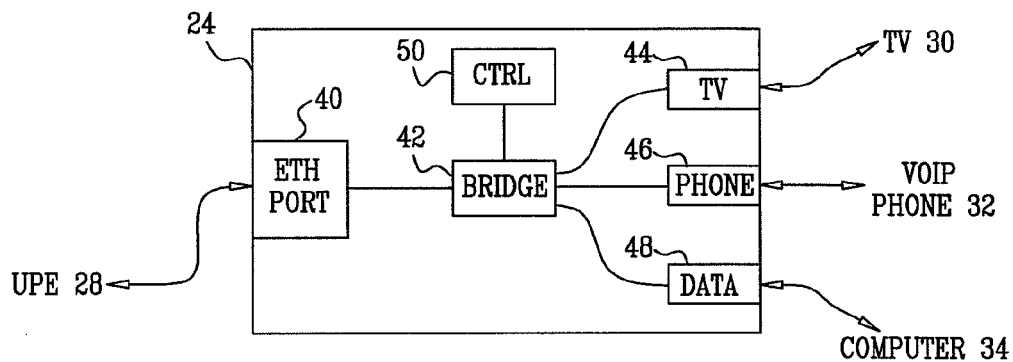
FIG. 2 is a block diagram that schematically shows details of a home access gateway (HAG) used for Ethernet access, in accordance with an embodiment of the present invention.

FIG. 2 is a block diagram that schematically shows details of gateway 24, in accordance with an embodiment of the present invention. The gateway may have the form of a closed box, which does not require (and may possibly not even permit) manual configuration. Rather, the customer may simply buy or otherwise obtain a gateway that is compliant with a specified auto-provisioning protocol, such as that described hereinbelow, and plug in the required cables to connect to switch 28 and to the appropriate items of CPE. The auto-provisioning protocol runs automatically between switch 28 and gateway 24 when the gateway is plugged in and powered up, and the gateway then begins normal operation without further human intervention, i.e., with no further involvement by the customer or network operator.

Gateway 24 comprises an Ethernet port 40, which may typically have the form of a RJ-45 socket, a fiber port, or a connector for any other sort of Ethernet media, or may be wired internally within the gateway box. The Ethernet port may be connected via a suitable cable to an Ethernet wall jack, which connects via Ethernet LAN to the corresponding port 26 of switch 28. The gateway also comprises local service ports 44, 46, 48 for connection to corresponding items of CPE. Each port is associated with one of the network services carried over network 22. Thus, in the example shown in FIG. 2, port 44 is a video port, port 46 is a telephone port, and port 48 is an Internet data port. Alternatively, gateway 24 may support only one or two services, and may thus have a smaller number of ports, or the gateway may support other network services, in addition to or instead of the video, telephone, and data services mentioned above. To ensure that the customer connects ports 44, 46 and 48 properly, the respective functions of the ports are typically clearly marked on the exterior of the gateway. Additionally or alternatively, each of the local service ports may comprise a different type of connector socket.

An Ethernet bridge 42 connects port 40 to ports 44, 46 and 48. Bridge 42 may comprise any suitable sort of switch with VLAN-based forwarding capability. A controller 50 receives the auto-provisioning frames that are transmitted by gateway 28, indicating the association between VLAN identifiers and the corresponding network services. The controller then configures the forwarding tables used by bridge 42 so that the bridge transmits data frames arriving via Ethernet port 40 on any provisioned VLAN to the appropriate local service port. Another VLAN may be assigned for transmission of management packets, in which case bridge 42 is configured to forward packets on this VLAN to controller 50. Gateway 24 also receives upstream data frames from the items of CPE that are connected to ports 44, 46 and 48. Bridge 42 conveys these upstream frames via port 40 to switch 28 for transmission over network 22.

Controller 50 may comprise a microprocessor or a programmable or hard-coded logic device. In embodiments in which the controller comprises a programmable logic device or microprocessor, logic code or software for execution by the controller is typically stored in a suitable memory medium (not shown) in gateway 24. Optionally, additional processing functions may be incorporated in the gateway (or equivalently, the functions of the gateway may be integrated into a processing console). For example, the gateway may incorporate protocol- and application-level functions for processing packet video and/or VoIP calls, and may thus output a processed data stream, or even analog signals, rather than Ethernet frames, to television 30 and/or telephone 32.

Auto-Provisioning Procedure

Figure 3:
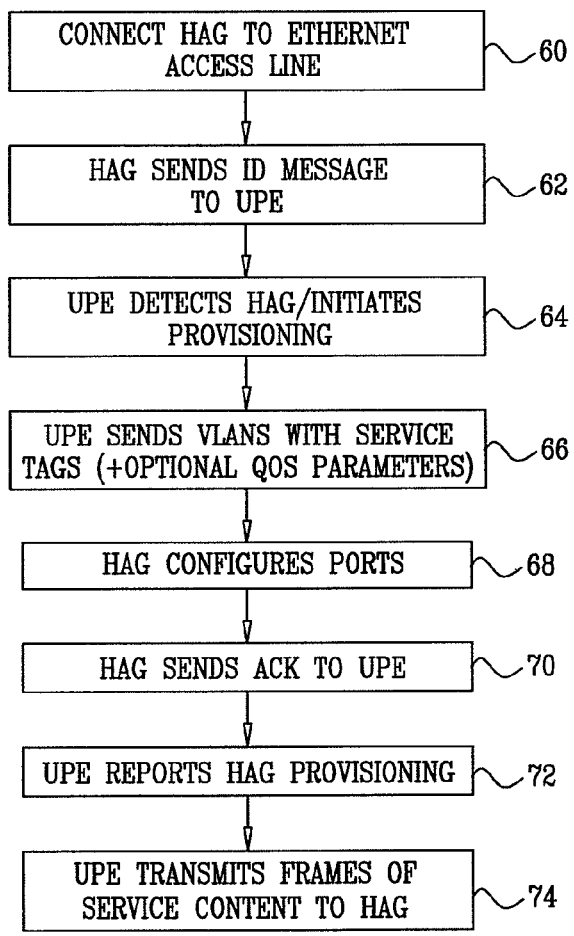
FIG. 3 is a flow chart that schematically illustrates a method for auto-provisioning of a HAG, in accordance with an embodiment of the present invention.

FIG. 3 is a flow chart that schematically illustrates a method for auto-provisioning of gateway 24, in accordance with an embodiment of the present invention. The method is initiated when a user connects port 40 of the gateway to an Ethernet access line that links the customer premises to switch 28, at a gateway connection step 60. Controller 50 senses that the Ethernet connection has been made and begins to transmit identification frames upstream over the Ethernet link to the switch, at an upstream transmission step 62. These frames inform the switch that CPE (i.e., the gateway) has been connected to the corresponding switch port 26, and that the CPE is requesting provisioning of network services in accordance with the predetermined Layer 2 protocol. The identification frames are standard Ethernet frames, which identify the medium access control (MAC) address of the gateway and contain an appropriate provisioning request payload, as specified by the Layer 2 protocol. There is no need, however, for the gateway to receive an IP address or to use any sort of Layer 3 functionality in order to initiate the provisioning procedure.

Upon receiving an identification frame from gateway 24, switch 28 detects that the gateway has been connected and initiates the provisioning procedure, at a provisioning initiation step 64. (Alternatively, the switch, rather than the gateway, may initiate the provisioning procedure without waiting to receive an identification frame from the gate.) As noted above, the switch may be configured to carry out the procedure itself, or it may alternatively pass the provisioning request through to server 38. In either case, it is assumed that the operator of network 22 has configured the switch or server with subscriber information regarding the particular port 26 that serves the customer premises in question. In other words, the customer premises are identified for service and billing purposes, and the switch or server has the necessary information regarding the types and level of network services that the customer has contracted to receive. The services themselves may ultimately be provided over networks 36 by unrelated third-party providers (including different, competing providers offering the same types of services), but Layer 2 provisioning takes place at the level of access network 22.

Switch 28 transmits one or more provisioning frames via port 26 to gateway 24, at a provisioning response step 66. As noted above, the switch may generate these frames itself, or it may receive and pass through the frames from server 38. The frames contain service records, formatted in accordance with the provisioning protocol, wherein each record contains a service tag (identifying the type of network service), a VLAN identifier, and optionally a Quality of Service (QoS) parameter that is associated with the network service. For example, the switch may transmit the following sequence of records:

| VLAN ID | Service tag | QoS |
|---|---|---|
| VLAN #10 | Telephone | Priority #1 |
| VLAN #20 | Video | Priority #2 |
| VLAN #30 | Internet data | Priority #4 |
| VLAN #40 | Management | Priority #3 |

The QoS parameters may indicate not only priorities, as listed in the table above, but also other sorts of measures of service level that are known in the art, such as guaranteed and/or excess bandwidth allocations. One of the types of service (typically management) may use the native VLAN (which is typically transmitted between switch 28 and gateway with no VLAN identifier tag).

The records transmitted at step 66 may be encapsulated in the provisioning frames using any suitable encapsulation protocol that both the switch and gateway are configured to support. For example, although the E-LMI protocol described above does not at present support the sort of provisioning that is described herein, this protocol may be extended by definition of new Type, Length and Value (TLV) identifiers for use in conveying the required provisioning messages. Alternatively, other existing or new Layer-2 protocols could be used for this purpose.

Upon receiving the provisioning frames at gateway 24, bridge 42 passes the frames to controller 50, which extracts the provisioning records and configures the bridge accordingly, at a configuration step 68. In other words, the controller sets up the bridge forwarding table so that each of the provisioned VLANs is associated with the port to which the bridge should forward incoming frames on that VLAN. As a result, when the bridge subsequently receives frames via port 40 with VLAN #10, for example, the bridge will forward the frames to telephone port 46 with highest priority.

In response to the provisioning frames transmitted at step 66, controller 50 transmits an acknowledgement (ACK) frame via port 40 to switch 28, at an acknowledgement step 70. This step is optional, but desirable in order to provide confirmation that gateway 24 has been successfully configured and actually supports all the services that have been provisioned. Switch 28 may pass the acknowledgement on to server 38 or to another management server for purposes of record-keeping and billing, at a reporting step 72. Optionally, at step or subsequently, controller 50 may report a pre-configured IP address of gateway 24 for use in subsequent management communications. Alternatively, if the IP address has not been pre-configured, the controller may request an IP address for management purposes, using the Dynamic Host Configuration Protocol (DHCP), for example. The IP address may be used, if necessary, in subsequent provisioning activities that are based on other provisioning protocols, such as the above-mentioned TR-069. Such protocols operate at Layer 3 and above and thus require prior assignment of an IP address.

After provisioning has been completed, switch 28 transmits frames containing service content, such as video, voice or Internet data, over the link to gateway 24, at a service transmission step 74. Each frame carries the appropriate VLAN identifier for the service in question. Bridge 42 is thus able to forward each frame to the appropriate port 44, 46, 48 or to controller 50 based solely on the VLAN identifier.

Although the embodiments described above make reference to certain specific standards and protocols, the principles of the present invention may similarly be applied in networks that are subject to other standards and using other suitable Layer 2 protocols. It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. An apparatus comprising:
   an Ethernet port operable to connect to an Ethernet access network providing multiple different services, the multiple different services selected from a group of services consisting of video, telephony, and data services, each service provided via a different Virtual Local Area Network (VLAN) via Ethernet protocol;
   a plurality of local service ports operable to connect to items of peripheral customer premises equipment (CPE), each item supporting a different, respective service among the multiple different services provided by the Ethernet access network;
   a bridge operable to convey data frames between the Ethernet port and the local service ports; and
   a controller operable to:
      determine that the bridge has been connected to the Ethernet access network;
      in response to the determination that the bridge has been connected to the Ethernet access network, transmit, via the Ethernet port, an upstream message indicating that the bridge has been connected to the Ethernet access network;
      receive, via the Ethernet port, at least one downstream provisioning message indicating associations between the services and respective VLAN identifiers, wherein the at least one downstream provisioning message indicates a different VLAN identifier to be respectively associated with each of the services; and in response to the at least one downstream provisioning message, configure the bridge to forward data frames received via the Ethernet port on each VLAN to a respective local service port in accordance with the associations, wherein each data frame comprises a VLAN identifier in accordance with the associations.

2. The apparatus of claim 1, wherein the transmitted upstream message requests the at least one downstream provisioning message.

3. The apparatus of claim 1, wherein the controller is further operable to transmit the upstream message and to receive the at least one downstream provisioning message without using an Internet Protocol (IP) address.

4. The apparatus of claim 1, wherein the at least one downstream provisioning message indicates a further VLAN to be used for management communications, and wherein the controller is further operable to configure the bridge to convey data frames on the further VLAN to the controller.

5. The apparatus of claim 1, wherein, in response to the at least one downstream provisioning message, the controller is further operable to configure the apparatus for operation automatically, without human intervention other than connection of the ports to the Ethernet access network and to the items of peripheral CPE.

6. The apparatus of claim 1, wherein the controller is further operable to transmit an acknowledgment frame via the Ethernet port to the Ethernet access network in response to receiving the at least one downstream provisioning message.

7. The apparatus of claim 1, wherein the at least one downstream provisioning message comprises respective quality of service (QoS) parameters assigned to the VLAN identifiers, and wherein the controller is further operable to configure the bridge to forward the data frames associated with the different services at different, respective service levels according to the QoS parameters.

8. The apparatus of claim 1, wherein the local service ports are marked on an exterior of the apparatus to indicate the respective service that is supported by each of the local service ports.

9. A method comprising:
determining that a home access gateway bridge has been connected to a port of an Ethernet access network providing multiple different services, the services selected from a group of services consisting of video, telephony, and data services, each service provided via a different Virtual Local Area Network (VLAN) via Ethernet protocol, the home access gateway bridge being between the Ethernet access network and customer premises equipment (CPE) connecting to the services;
in response to the determination that the home access gateway bridge has been connected to the port of the Ethernet access network, transmitting, via an Ethernet port, an upstream message that indicates that the home access gateway bridge has been connected to the port of the Ethernet access network;
receiving, via the Ethernet port, at least one downstream provisioning message indicating associations between the services and respective VLAN identifiers, where the at least one downstream provisioning message indicates a different VLAN identifier to be respectively associated with each of the services; and
in response to receiving the at least one downstream provisioning message, configuring the home access gateway bridge to deliver the services to the CPE in accordance with the associations, wherein each data frame of the services comprises a VLAN identifier in accordance with the associations.

10. The method of claim 9, wherein the upstream message is transmitted and the at least one downstream provisioning message is received without using an Internet Protocol (IP) address.

11. The method of claim 9, wherein the at least one downstream provisioning message indicates a further VLAN to be used for management communications, and wherein the method further comprises transmitting management frames on the further VLAN to the CPE.

12. The method of claim 9, wherein receiving the at least one downstream provisioning message comprises configuring the CPE for operation automatically, without human intervention other than connecting the ports to the Ethernet access network and the CPE.

13. The method of claim 9, further comprising transmitting, via the Ethernet port, an acknowledgment frame in response to receiving the at least one downstream provisioning message.

14. The method of claim 9, wherein the at least one downstream provisioning message comprises respective quality of service (QoS) parameters assigned to the VLAN identifiers.

15. A non-transitory computer readable medium comprising logic, the logic, when executed by a controller, operable to:
determine that a home access gateway bridge has been connected to a port of an Ethernet access network providing multiple different services, the services selected from a group of services consisting of video, telephony, and data services, each service provided via a different Virtual Local Area Network (VLAN) via Ethernet protocol, the home access gateway bridge being between the Ethernet access network and customer premises equipment (CPE) connecting to the services;
in response to the determination that the home access gateway bridge has been connected to the port of the Ethernet access network, transmit, via an Ethernet port, an upstream message that indicates that the home access gateway bridge has been connected to the port of the Ethernet access network;
receive, via the Ethernet port, at least one downstream provisioning message indicating associations between the services and respective VLAN identifiers, where the at least one downstream provisioning message indicates a different VLAN identifier to be respectively associated with each of the services; and
in response to receiving the at least one downstream provisioning message, configure the home access gateway bridge to deliver the services to the CPE in accordance with the associations, wherein each data frame of the services comprises a VLAN identifier in accordance with the associations.

16. The non-transitory computer readable medium of claim 15, wherein the upstream message is transmitted and the at least one downstream provisioning message is received without using an Internet Protocol (IP) address.

17. The non-transitory computer readable medium of claim 15, wherein the at least one downstream provisioning message indicates a further VLAN to be used for management communications, and wherein the logic is further operable, when executed by the controller, to transmit management frames on the further VLAN to the CPE.

18. The non-transitory computer readable medium of claim 15, wherein the logic is further operable, when executed by the controller, to configure the CPE for operation automatically, without human intervention other than connecting the ports to the Ethernet access network and the CPE.

19. The non-transitory computer readable medium of claim 15, wherein the logic is further operable, when executed by the controller, to transmit, via the Ethernet port, an acknowledgment frame in response to receiving the at least one downstream provisioning message.

20. The non-transitory computer readable medium of claim 15, wherein the at least one downstream provisioning message comprises respective quality of service (QoS) parameters assigned to the VLAN identifiers.

* * * * *